Sept. 6, 1949.  L. W. MUELLER ET AL  2,481,142
CORPORATION STOP
Filed April 13, 1945
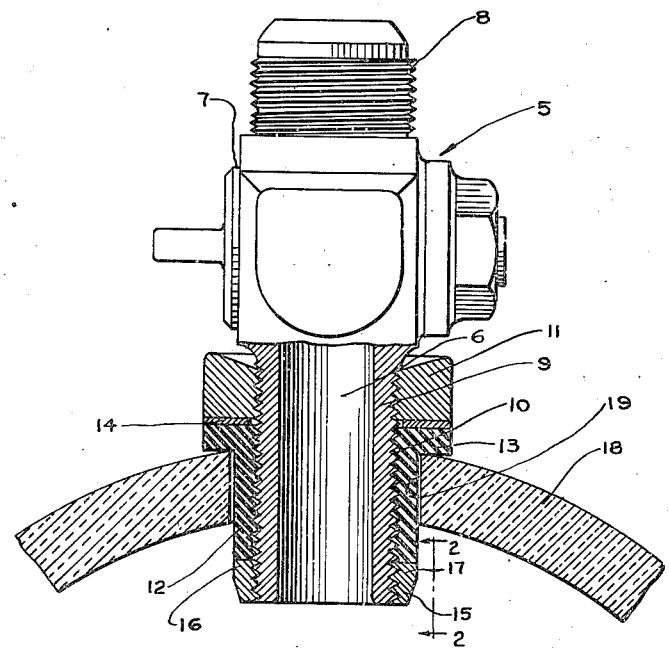
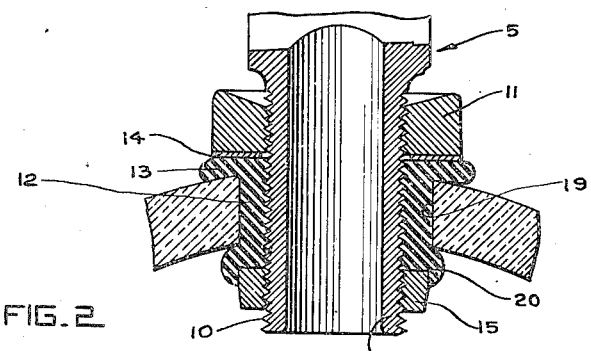
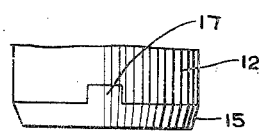
Inventors:
Lucien W. Mueller,
Walter J. Bowan,
Wallace E. Gould,
By Cushman Darby & Cushman
Attorneys Patented Sept. 6, 1949

2,481,142

UNITED STATES PATENT OFFICE 2,481,142

CORPORATION STOP

Lucien W. Mueller, Walter J. Bowan, and Wallace E. Gould, Decatur, Ill., assignors to Mueller Co., Decatur, Ill., a corporation of Illinois Application April 13, 1945, Serial No. 588,096

1 Claim. (Cl. 285—165)

This invention relates to corporation stops and method of installing the same and has as its principal object to provide an installation obviating the usual threaded connection between the stop and the main while yet establishing an effective interlock between the two. The invention has special value in cases where the main is of "Transite" or other similar plastic material which quickly dulls the tap used in threading the main opening, although the invention is not limited to this particular use. An installation in accordance with the invention is shown by way of example in the accompanying drawing, in which Figure 1 shows a portion of a main in transverse section and a stop, partially in longitudinal section and partially in elevation, in process of installation;

Figure 2 is an elevation of the lower portion of the stop of Figure 1, and

Figure 3 is a view like Figure 1 showing the completed installation.

The stop comprises an elongated body 5 having a longitudinal flow passage 6 intersected by a conical valve seat which receives a conical valve plug 7. One end of the body is provided with threads 8 through which the stop can be coupled with the service line.

The other end of the body is constituted by a neck 9 provided with a continuous external thread 10 from adjacent the valve to the outer extremity of the neck. Threaded on the neck is an abutment nut 11, here shown as being of the form disclosed in the patent to J. W. Simpson No. 2,265,703 of December 9, 1941. Outwardly of nut 11 a sleeve 12 freely embraces the neck so that the latter is relatively rotatable, the sleeve being of rubber or equivalent material, either natural or synthetic. Adjacent nut 11 the sleeve has an integral annular flange 13 and interposed between the flange and the nut is an anti-friction washer 14. Threaded on the extremity of neck 9 is a circular nut 15 which is downwardly tapered and has upwardly projecting lugs 16 and 17 engaged in recesses in the lower end of sleeve 12 in the manner particularly shown in Figure 2. These interengaging provisions are typical of means by which the sleeve and nut 15 may be held against relative rotation. Desirably the two are bonded together. With the nut 11 at the inner end of the neck portion 9 and the nut 15 at the outer extremity of the latter, as illustrated in Figure 1, the sleeve 12 presents a smooth cylindrical exterior between flange 13 and nut 15 and its length is substantially greater than the thickness of the main with which the stop is to be associated.

In installing the stop, the main 18, which is assumed to contain a fluid under pressure, has a drilling machine mounted thereon and a lateral opening 19 of somewhat greater diameter than the sleeve 12 is formed in the main. The drilling machine may be of the type as shown, for example, in the patent to F. H. Mueller et al., No. 2,296,651 of September 22, 1942. After the opening has been formed, the boring bar is withdrawn and the bit is replaced by a stop inserting tool such as is shown, for example, in the patent to F. H. Mueller et al., No. 2,247,427 of July 1, 1941, and the threads 8 of the closed stop are engaged with the tool.

The boring bar is then lowered to insert the neck portion and sleeve through the main opening, the stop end being guided into the latter by the tapered outer wall of nut 15. After flange 13 has come into contact with the top margin of the opening 19, downward pressure is exerted on the boring bar so that the abutment nut 11, through washer 14, compresses flange 13 against the main, whereupon the boring bar is turned, while the downward pressure is maintained, so that nut 15 is threaded upwardly by reason of the fact that it is held by the sleeve against rotation. The rising of nut 15 bulges the sleeve into engagement with the wall of the opening and with the neck threads and also develops an annular bulge 20, Figure 3, under the lower edge of the opening 19 so that the stop is locked to the main. During this operation the washer 14 takes the thrust of nut 11 so that the latter can be readily rotated with the stop body relatively to the sleeve. After the interlock has been effected, the inserting tool is unthreaded from the stop and the drilling machine dismounted. If necessary, nut 11 can then be threaded downwardly to further compress gasket 13 to perfect the seal between it and the main, and to further expand the bulge 20 for full effectiveness. In this manner, a full peripheral seal is provided with the top and bottom margins of the opening and also throughout the length of the latter.

It will be understood that the described form and arrangement of parts are susceptible of variation without departure from the invention as defined in the claim which follows:

We claim:

A coupling for connection to an element comprising an elongated body having a longitudinal flow passage, one end of said body being in the form of an externally threaded, tubular neck portion, an annular abutment threaded on said neck portion back from the outer end thereof, a rubber sleeve freely embracing said neck portion outwardly of said abutment and having an annular flange adjacent said abutment, and a nut threaded on said neck portion, the top of said nut being fixed to the outer edge of said rubber sleeve, whereby the rotation of said neck in said nut draws the nut toward the abutment for distorting the rubber sleeve in overlapping engagement with said element.

LUCIEN W. MUELLER.
WALTER J. BOWAN.
WALLACE E. GOULD.

REFERENCES CITED

The following references are of record in the file of this patent:

UNITED STATES PATENTS

| Number | Name | Date |
|---|---|---|
| 590,590 | Prevet | Sept. 28, 1897 |
| 945,517 | Goodwin | Jan. 4, 1910 |
| 966,748 | Honecker | Aug. 9, 1910 |
| 1,599,098 | Mix | Sept. 7, 1926 |

FOREIGN PATENTS

| Number | Country | Date |
|---|---|---|
| 512,256 | Great Britain | Aug. 31, 1939 |
| 735 | Great Britain | Jan. 11, 1910 |